United States Patent [19]
Stephenson, Jr.

[11] Patent Number: 5,192,950
[45] Date of Patent: Mar. 9, 1993

[54] PARTIAL WORD TO FULL WORD PARALLEL DATA SHIFTER

[75] Inventor: William H. Stephenson, Jr., Raleigh, N.C.

[73] Assignee: Alcatel Network Systems, Inc., Richardson, Tex.

[21] Appl. No.: 808,533

[22] Filed: Dec. 16, 1991

[51] Int. Cl.[5] .............................................. H03M 7/00
[52] U.S. Cl. ..................................... 341/100; 341/141
[58] Field of Search ........................ 341/100, 101, 141; 360/40; 370/105.1, 82, 83

[56] References Cited

U.S. PATENT DOCUMENTS 4,675,652 6/1987 Machado .
5,081,654 1/1992 Stephenson, Jr. et al. ... 370/105.1 X Primary Examiner—Sharon D. Logan
Attorney, Agent, or Firm—Ware, Fressola, Van Der Sluys & Adolphson

[57] ABSTRACT

A partial word to full word parallel data shifter comprises 2N−1 multiplexer for selectively receiving data from the incoming current data word of width up to N, or from remainder bits of previously received data. The multiplexers output their data to 2N−1 latches, N of which output a full parallel data word and N−1 of which can recirculate up to N−1 remainder bits back to the multiplexers. If the number of remainder bits plus the number of data bits for the currently received word is less than N, the bits in the first N latches are not output but rather recirculate to the multiplexers where they are aligned for generating a full N bit output word with the most significant bit(s) of the next incoming parallel data.

10 Claims, 9 Drawing Sheets

PARTIAL WORD TO FULL WORD PARALLEL DATA SHIFTER

FIELD OF THE INVENTION

This invention relates generally to the field of digital data communication equipment and more particularly, to communication equipment which interface two different communication protocols, including protocols which may operate at different speeds and in different formats.

DESCRIPTION OF THE PRIOR ART

One conventional way to realign partial data words into full data words is to convert the partial wording to sequential serial data and to then hold the data until N or more bits are stored in the serial registers where N is equal to the word length. At that point the data can be reconverted back to parallel data words. A second method to realign partial data words into full words is to use an elastic store between the two parallel data streams with an asynchronous interface between the two sides so as to pass framing and data alignment information to the opposite side.

The shortcoming with the first method is that a high-speed clock is required in order to perform the serial conversions. Such a high speed clock generally requires a different type of logic to be utilized such as emitter coupled logic (ECL) instead of the more desirable than complimentary metal oxide logic (CMOS) which however, cannot operate at speeds much in excess of 50 megabits per second.

Due to the fact that a different logic family may be required to do the serial conversions of the first method results in increased power consumptions since ECL logic typically uses much greater power than CMOS.

With respect to the use of an elastic store, to hold the extra bits whenever a partial byte is received, such an elastic store generally is not used to store the stuff or control bits which may be included with such a partial data word. Otherwise, the stuff or control bits would form part of the full parallel word transmitted at the opposite end. In order to perform such removal of these unwanted bits with respect to the data to be presented in the full parallel word, additional circuitry is necessitated.

In particular, any digital system where a low speed, continuous data stream is mapped into a higher speed signal requires extra stuff bits and control bits in order to inform the receiving device with respect to how to extract the payload at the receiving device. In particular, equipment conforming to the synchronous optical network standard (SONET) uses a fixed payload size in conjunction with a varying data rate which can be mapped into the payload. Consequently, stuff bits and control bits are used to fill up the payload and must be extracted therefrom.

In summary therefore, the shortcomings with the prior art methods for performing a realignment of partial data words to full data words and in particular, partial data bytes to full data bytes are as follows:

1. Both prior art methods involve tracking circuitry on both sides of the data transfer device which adds complexity to the electronic circuitry.
2. The serial method requires an extra high speed clock which in turn may require special logic circuitry with increased power consumption as well as an extra set of registers to process the serial data.
3. The elastic store method requires special latches to perform the asynchronous control signal transfer as well as a storage device for the extra bits, all of which increases the amount of logic otherwise required.

SUMMARY OF THE INVENTION

According to the present invention, a partial data word to full data word parallel data shifter provides for sequential data transfer of partial data words into full data words using a single clock and a single control logic circuit. The data is transferred to a set of latches which realign the data in one step. By eliminating the control bits prior to entering the shifter as well as the handshaking between both sides of an asynchronous interface, the overall operation is simplified by the present invention.

In a preferred embodiment of the present invention, its use is made with respect to a partial data byte to a full data byte parallel data shifter. It specifically incorporates $2N-1$ N-bit input multiplexers and $2N-1$ latches, where N is the size of the parallel data (eight bits) to be output by the parallel data shifter so as to allow a full N-bit word to be added to an $N-1$ remainder so as to produce an N-bit output word with an $N-1$ remainder. An adder is used to control the recirculation and output of the data while the $2N-1$ multiplexers are selectively used to store and output the $N-1$ remainder back to the $2N-1$ latches so as to provide the remainder with incoming data so as to generate an output word with the proper data association between its most significant bit and least significant bit.

An N-bit adder is used to count the bits of each partial word and uniquely outputs a NOCARRY enabled signal if the sum of the remainder from a previous addition and a new partial byte is less than N. In this situation, the NOCARRY enabled signal causes the partial data word in the latches to recirculate, since a complete N-bit word is not present.

OBJECTS OF THE INVENTION

It is therefore a principal object of the present invention to provide a partial word to full word parallel data shifter wherein incoming data is transferred to a plurality of multiplexers in a controlled fashion, wherein this data is output to a set of latches which in turn output a full data word and which also recirculate remainder bits beyond the full data word back to the multiplexers so as to cause the partial data word to be realigned in a single step.

Another object of the present invention is to provide a partial data word to full data word parallel data shifter which uses an adder to control the recirculation and output of the parallel data word.

A still further object of the present invention is to provide a partial word to full word parallel data shifter wherein the adder generates a NOCARRY indication if the sum of the remainder from the previous addition and a new partial word is less than the word size N and if so, the NOCARRY enabled signal causes the partial word in the latches to recirculate since a complete N-bit word is not complete.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in conjunction with the accompanying drawings in which:

FIGS. 1A, 1B, 1C and 1D show the partial word to the full word parallel data shifter used in conjunction with a parallel DS3 telephony standard transmission and in particular, a DS3 alarm indication signal (AIS)/Idle Code Generator for use in generating parallel data output used in a SONET standard parallel data word output.

FIGS. 2A, 2B, 2C and 2D are a detailed block diagram of the multiplexers and latches, as well as control logic circuitry used to form the present invention.

FIGS. 3A, 3B and 3C are a detailed block diagram of the adder used in the specific implementation shown in FIG. 1C.

BEST MODE FOR CARRYING OUT THE INVENTION

Figure 1A:
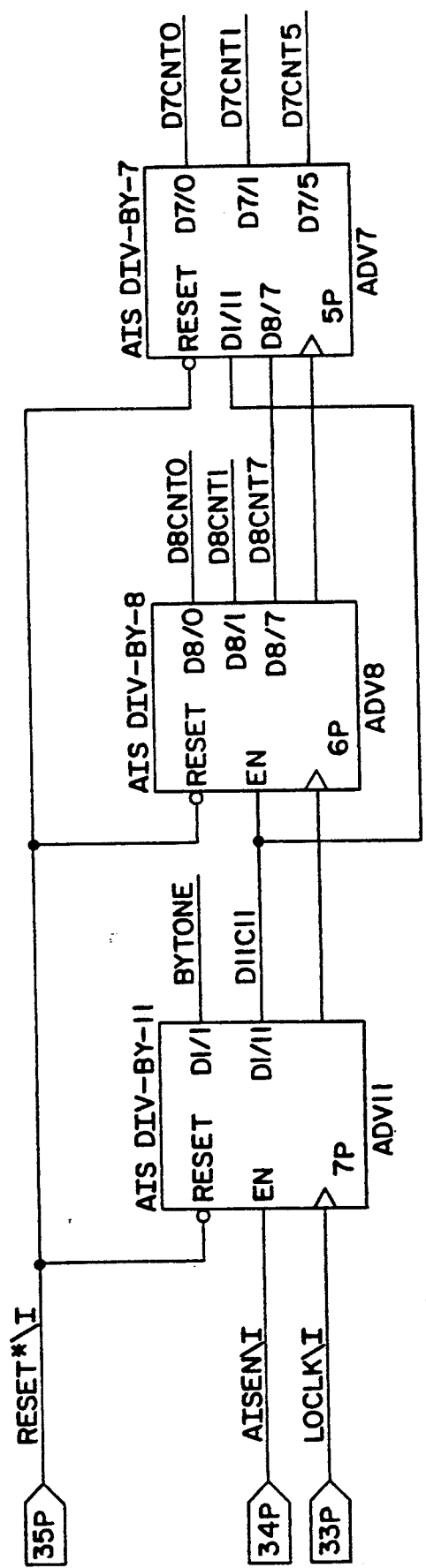
Figure 1B:
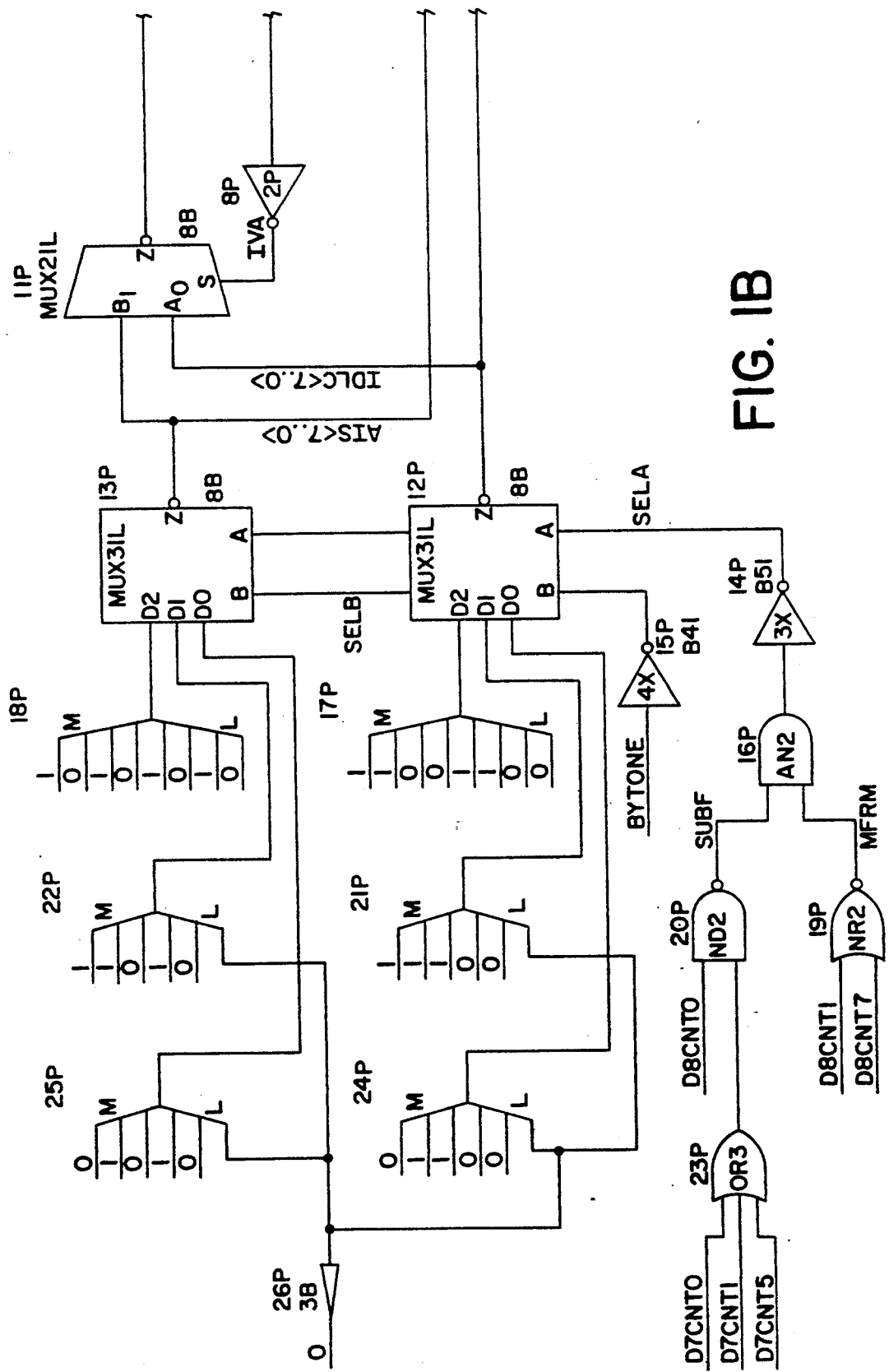
Figure 1C:
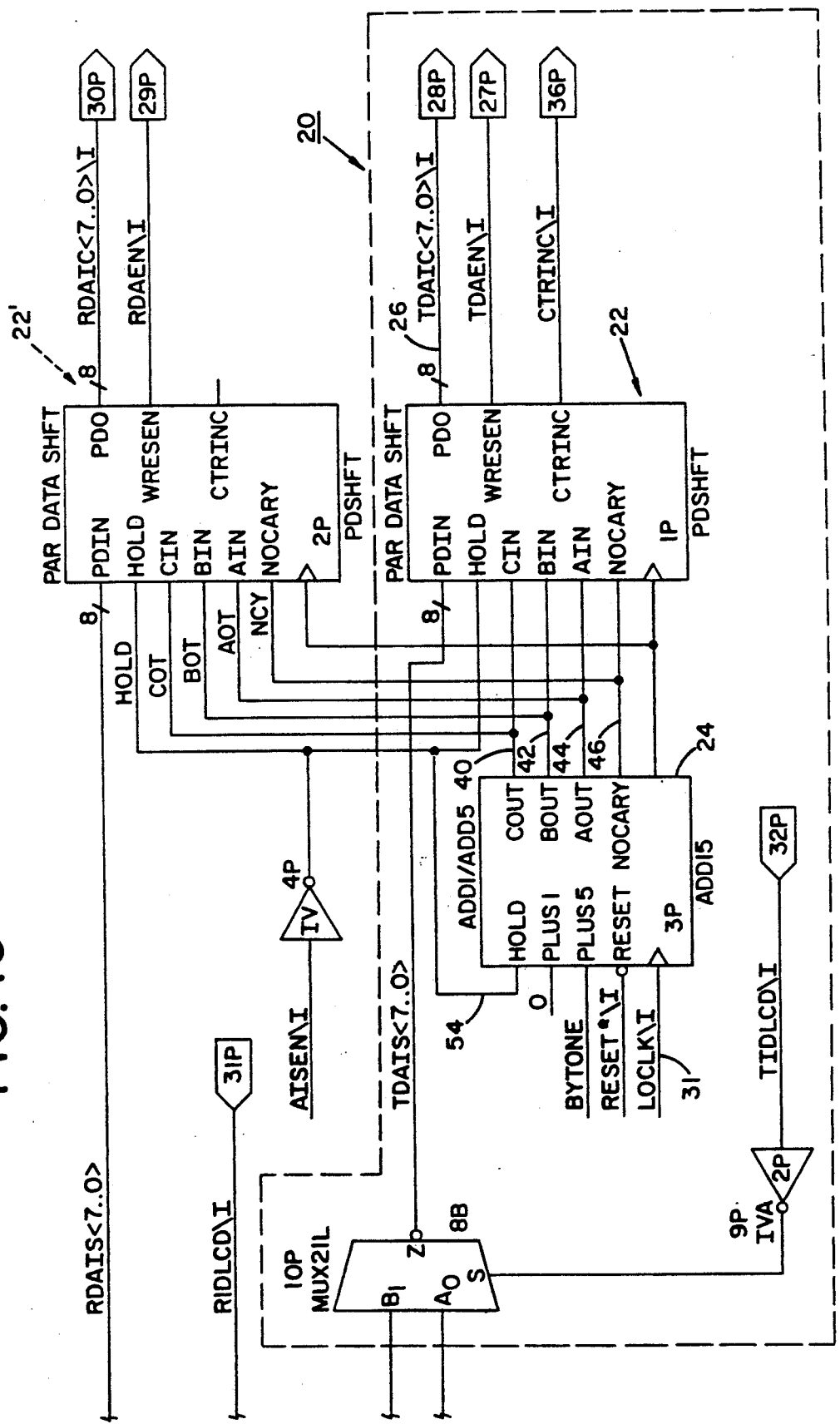

As seen in FIG. 1C, a partial word to full word parallel data shifter 20 comprises a control logic and storage module 22 and an adder 24 which is used to generate control signals for causing the control logic and storage module to output a full word of data on parallel output bus 26. The implementation of the invention shown in FIGS. 1A-1D is used in conjunction with a DS3 AIS/Idle Code Generator. Details of the DS3 AIS/Idle Code Generator can be found in copending application filed on the same date hereof, entitled, AIS/Idle Code Generator, inventor William H. Stephenson, Jr., which is hereby incorporated by reference. The second control logic and storage module 22' performs the same function as module 22 and is not needed for operation of the parallel data shifter.

The implementation of the invention shown in FIGS. 1A-1D, 2A-2D and 3A-3C is specifically for an output word comprising eight bits (N=8).

Figure 2A:
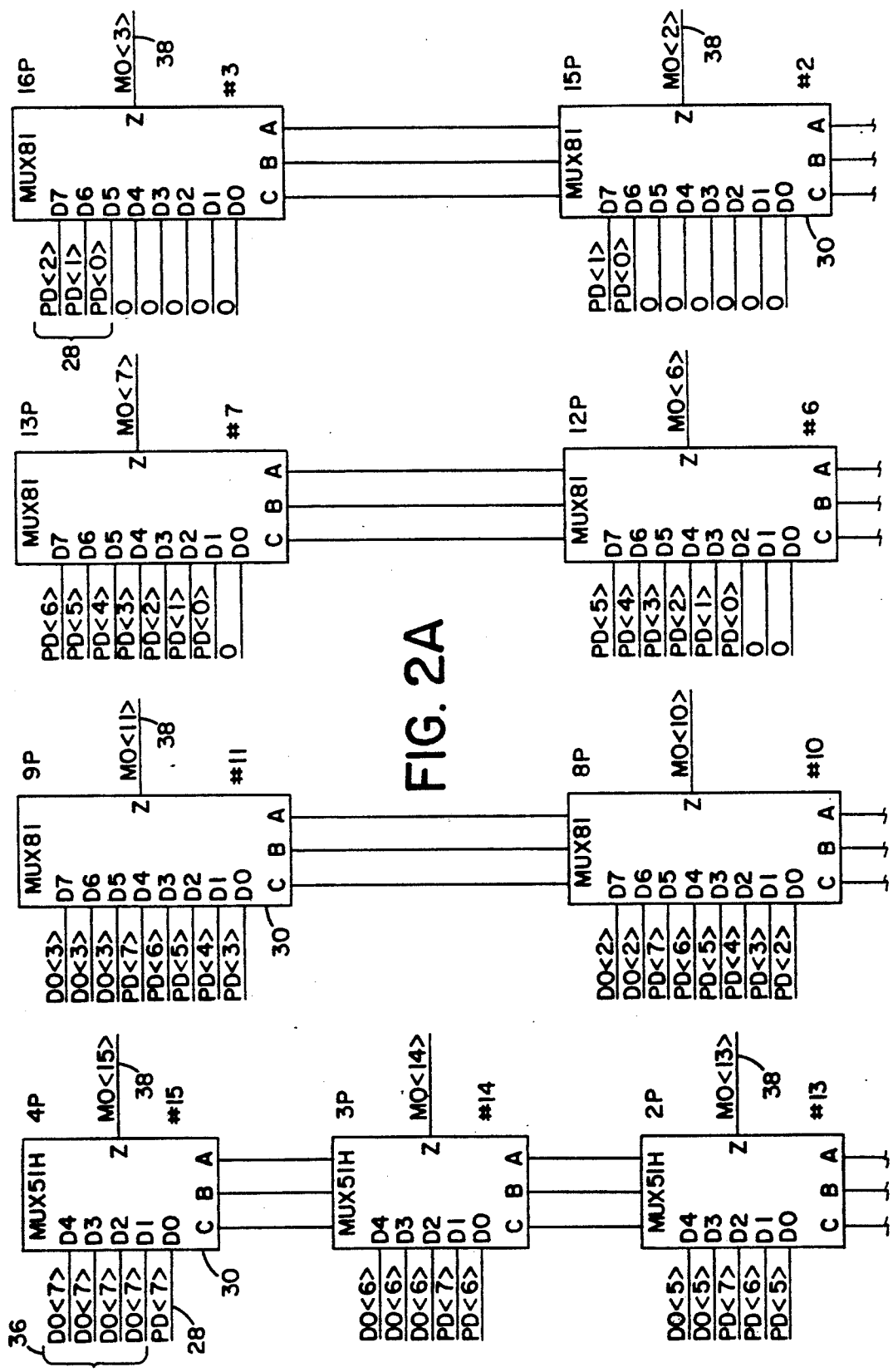
Figure 2B:
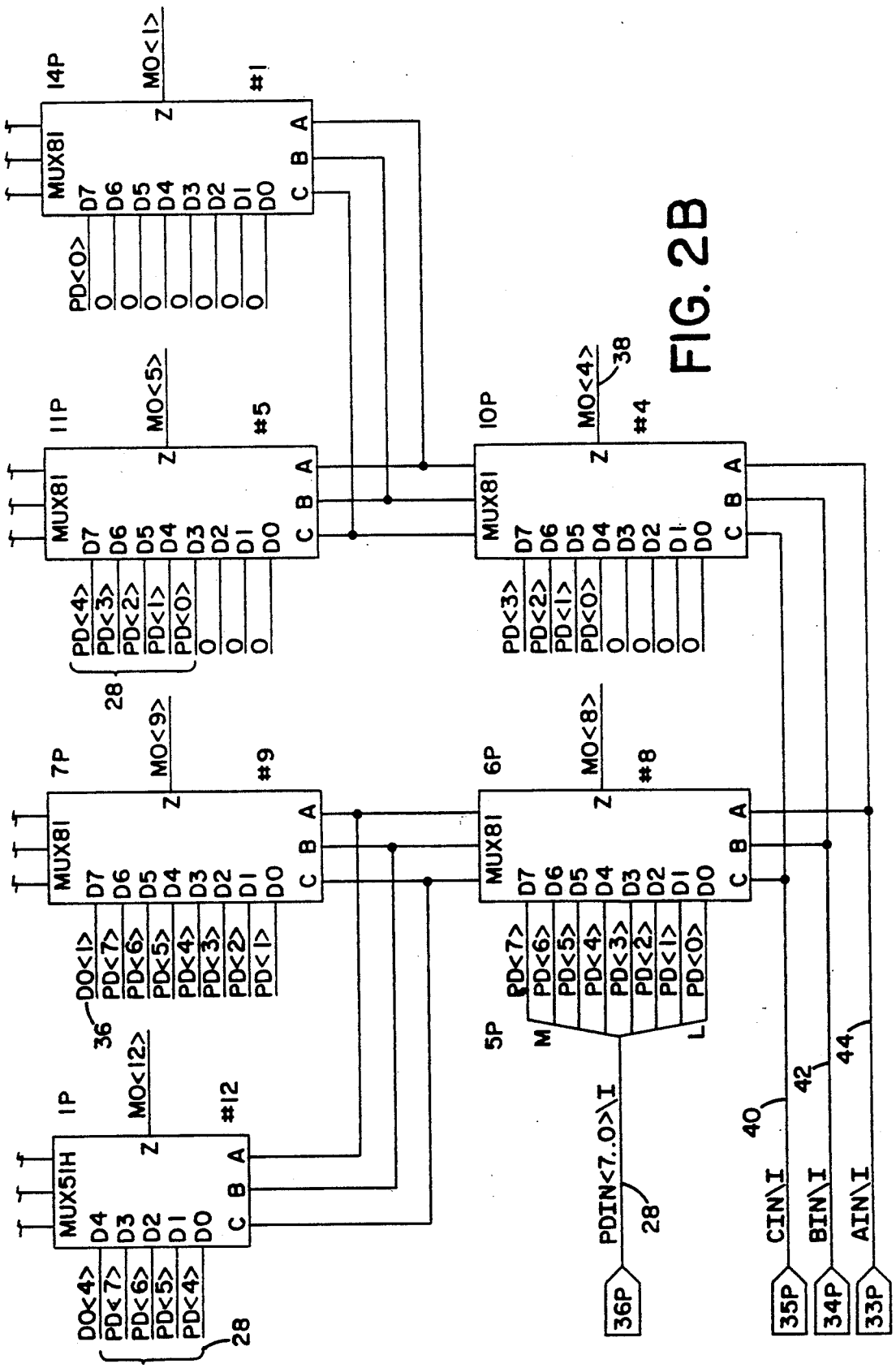

As seen in FIGS. 2A, 2B, incoming data which may comprise full or partial data bytes is received via input bus 28 and is controllably presented to 2N−1 multiplexers 30. The specific incoming data are denoted by the notations PD<0> through PD<7>. The multiplexers in turn are denoted by the numbers #1 through #15.

Figure 2C:
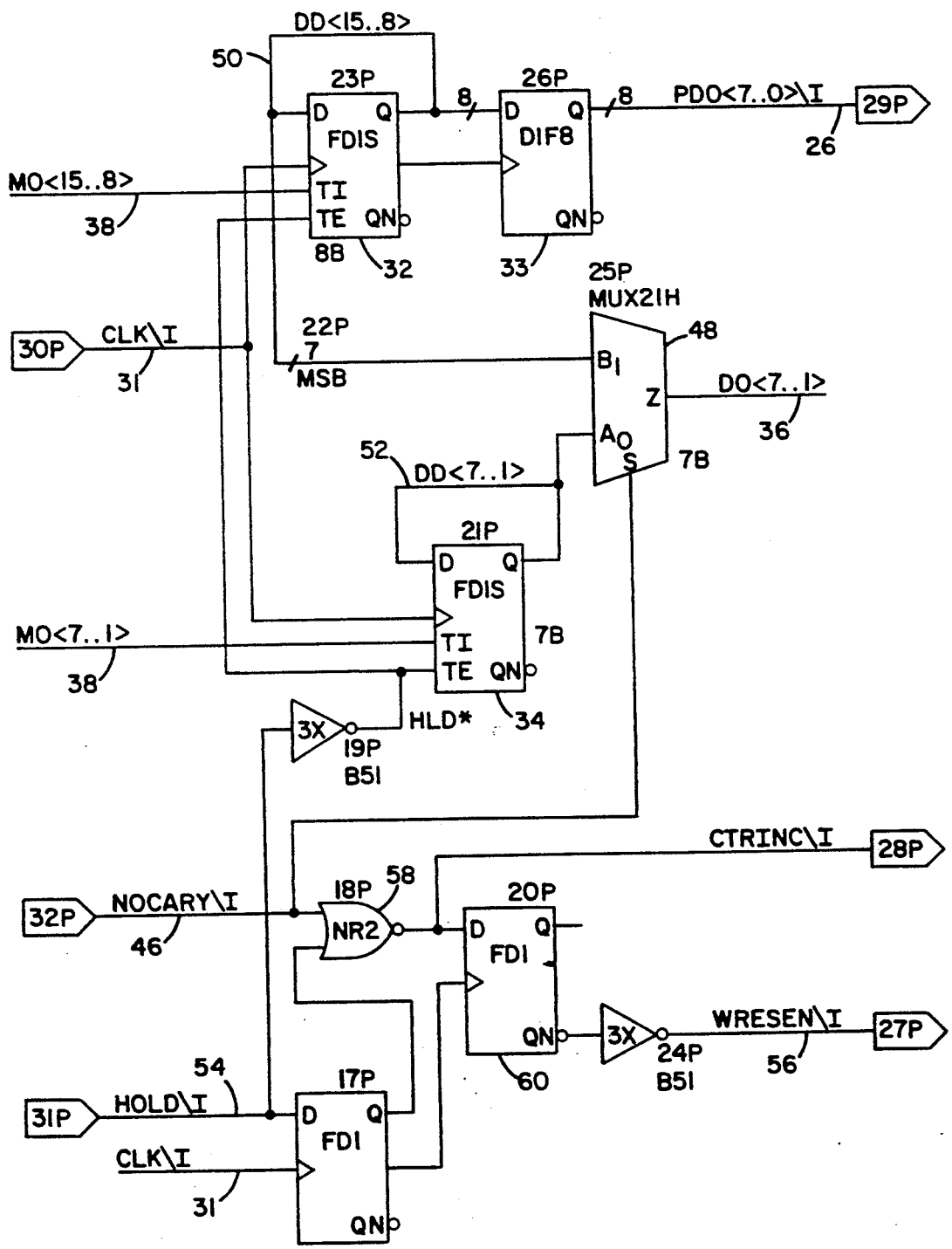

Also shown in FIG. 2C are the 2N−1 input latches (flip-flops) with latch module 32 comprising eight flip-flops and latch module 34 comprising seven flip-flops. Module 32 generates the output of the full parallel data word on parallel bus 26 while module 34 provides the remainder data generated on remainder output data bus 36 for presentation to multiplexers #8 through #15 shown in FIGS. 2A, 2B. The multiplexers each have a single bit output line 38 designated by the nomenclature MO<X>, where X is the multiplexer number. Outputs MO<15..8> are presented to latches 32 while outputs MO<7..1> are presented to latches 34. The addition output of adder 24 (FIG. 1C) comprises three output lines, COUT 40, BOUT 42 and AOUT 44 respectively representing the most significant bit to the least significant bit of the add output. These lines are also respectively designated CIN 40, BIN 42 and AIN 44 as shown in FIG. 2B. These three adder output lines control which bit of either the input bus 28 or the remainder bus 36 is selected for presentation on the multiplex output line 38 MO<x> for each of the fifteen multiplexers (see also FIG. 2A).

Thus, as shown in FIG. 2C, in order to produce a N-bit wide word, 2N−1 input latches 32 and 34 are required (latch 32 comprising eight bits in the given example and latch 34 comprising seven bits). This technique allows a full N-bit wide word to be added to a N−1 remainder which produces an N-bit output word with an N−1 remainder. In addition to controlling which input line is selected by end multiplexer, the N-bit adder is also used to count the bits of each partial word and outputs a NOCARRY enable signal on output line 46 if the sum of the remainder on remainder output bus 36 and a new partial byte received on input 28 (FIG. 2B) is less than N. If the NOCARRY signal is enabled, it causes the partial word in the latches 32 and 34 to recirculate since a complete N-bit word is not present. The data from latches 32 is then sent as the remainder bits to multiplexer 30 (FIG. 2A) and the PDO<7.1> outputs are not used downstream for that clock cycle. If however the sum is greater than N, then the NOCARRY signal is disabled and a complete N-bit word is output on bus 28 and a new remainder equal to the SUM -N is output on remainder bus 36 while a new multiplexer address is used with the next word.

OPERATION OF THE PARALLEL DATA SHIFTER

The operation of the parallel data shifter is best understood with reference to FIGS. 2A-2D. As explained above, the parallel data shifter is responsible for taking in partial word of data justified to the most significant bit (MSB) and outputting a complete N bit data word. In the example shown in FIGS. 1A-1D through 3A-3C, N equals 8. Thus, fifteen flip-flops form latches 32 and 34 and are arranged as a fifteen-bit wide parallel register. The eight MSB's contain the outgoing data for bus 28 (FIG. 2B) and the seven least significant bits (LSB's) hold the remainder bits to be output on remainder bus 36 (FIG. 26). The outputs of both latches 32 and 34 go to a two input multiplexer 48 controlled by the NOCARRY signal received on line 46 from adder 24. Multiplexers 30 (FIG. 2A) control the data alignment of the data being latched into latches 32 and 34. The output of adder 24 via output lines 40, 42 and 44 (CIN, BIN, and AIN) are transferred to each multiplexer for selection of the particular input bit to be presented on its output line 38 MO<x>.

For example, as shown in FIGS. 2A, 2C, if the address offset is 0 (CIN=BIN=AIN=0), multiplexer #15 passes the most significant bit of incoming data PDIN7 to the most significant bit flip-flop of latch 32 via output line MO<15> while multiplexer #14 passes the next bit (PDIN6) via its output MO<14> to the next significant bit of latch 32, and so forth. Thus, multiplexer #8 outputs the least significant bit (PDIN0) via its output MO<8> to the least significant of bit latch 32.

If the offset is equal to 2 (CIN=0,BIN=1,AIN=0), then the most significant bit (PDIN7) is input to multiplexer #13 which outputs this bit via its output line MO<13> to the third bit of latch 32. In this example, the two LSB's of the incoming data (PDIN1 and PDIN0) go to bits 7 and 6 of latch 34 via multiplexers #7 and #6 respectively. These two bits are the two MSB's of the next word.

During the next clock cycle of clock 31 (FIG. 2C), bits 7 and 6 (now DD<7> and DD<6> of recirculated data bus 52 from the Q output of flip-flop latches 34) pass through the two-input multiplexer 48 and are selected by the D2 inputs of multiplexers #15 and #14 respectively (multiplexer outputs MO<15> and MO<14>). Therefore, the two LSB's of the previous word are added to the six MSB's of the current word (from bus 28) while the two remaining bits of the current word are held until the next frame (word) is received.

If, however, as a five bit byte is received for the current word, the five bits are added to these two remaining bits. In this situation, one more bit is needed to complete a full word (a byte in this example), and thus the NOCARRY signal 46 (see FIGS. 1C and 2C) is enabled to reflect this situation. With the NOCARRY signal enabled during the next clock cycle, the two-input multiplexer 48 is forced to select latch data bits DD15..DD9 on bus 50, and to output this data on remainder bus 36 as remainder data bits DO<7..1> to multiplexers #15–#9 respectively so as to be outputted on their respectively multiplexer outputs MO<15>-MO<9>. The PDO<7..1> data on output bus 26 is ignored downstream due to the disenablement of WRESEN signal 56 by the NOCARRY enable signal. Of course, the NOCARRY signal could be used to directly inhibit latches 32 or driver 33 from sending output data PDO<7..0> if less than a full word of data was present during the current clock cycle. In the above example, the address offset from adder 24 is now seven (CIN=BIN=AIN=1) and the MSB of the next word is added to the previous seven bits to form a complete word to output on data output bus 26 as PDO<7..0>. The NOCARRY signal is OR'ed with the incoming HOLD signal (CTRINC), and retimed to produce the above referenced Elastic Store Enable signal (WRESEN) 56 by NOR gate 58 and flip-flop 60. This signal is active high whenever valid data is present on PDO<7..0>.

From the above examples it is seen that the adder output lines 40, 42, and 44 (FIG. 1C) determine which input for each multiplexer is selected for its corresponding output MO<x>. Referring to FIGS. 2A-2B the D0 input of each multiplexer is selected if CIN=BIN=AIN=0(0,0,0 hereafter), D1 if the value is (0,0,1) and in similar manner to the D7 input for value (1,1,1).

Figure 3A:
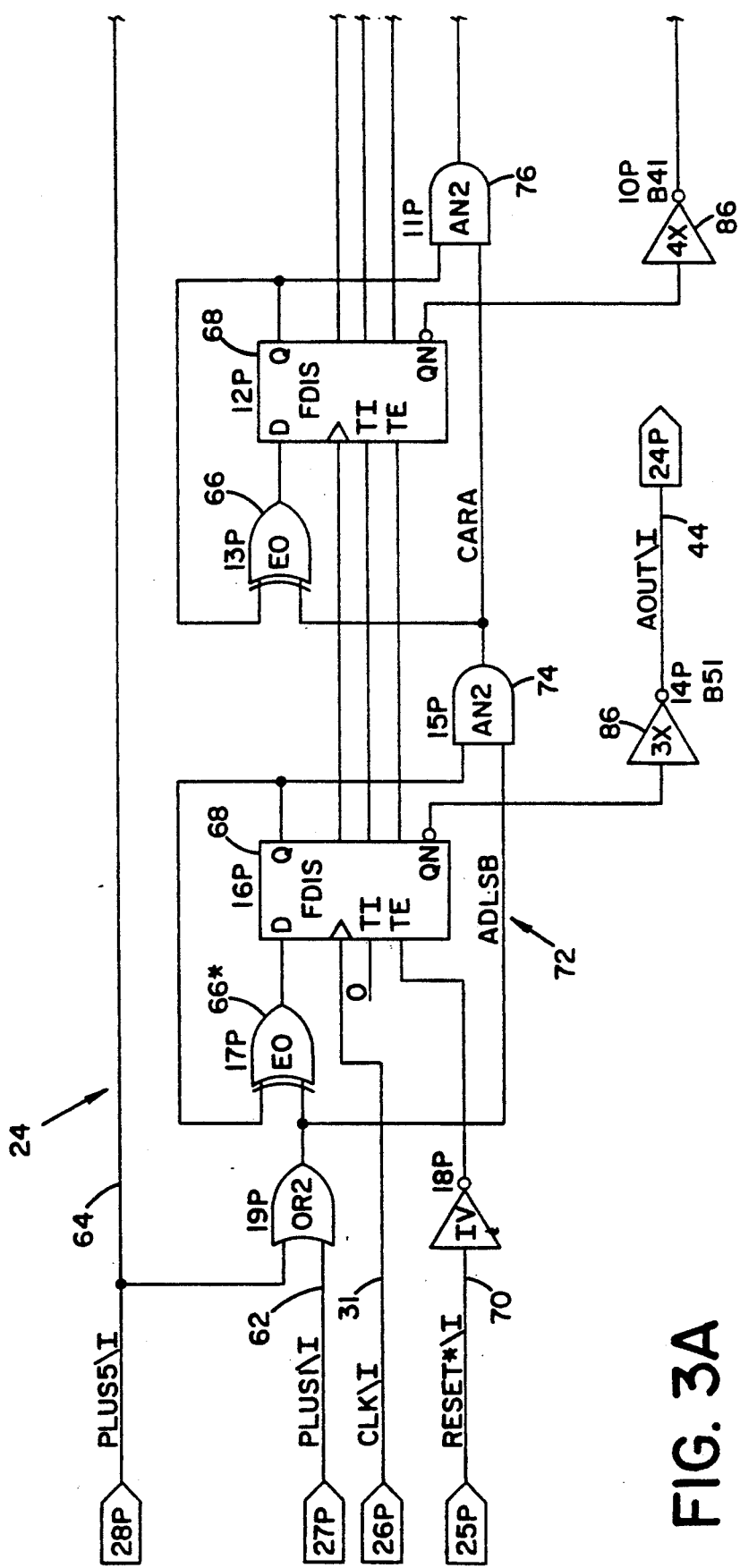
Figure 3B:
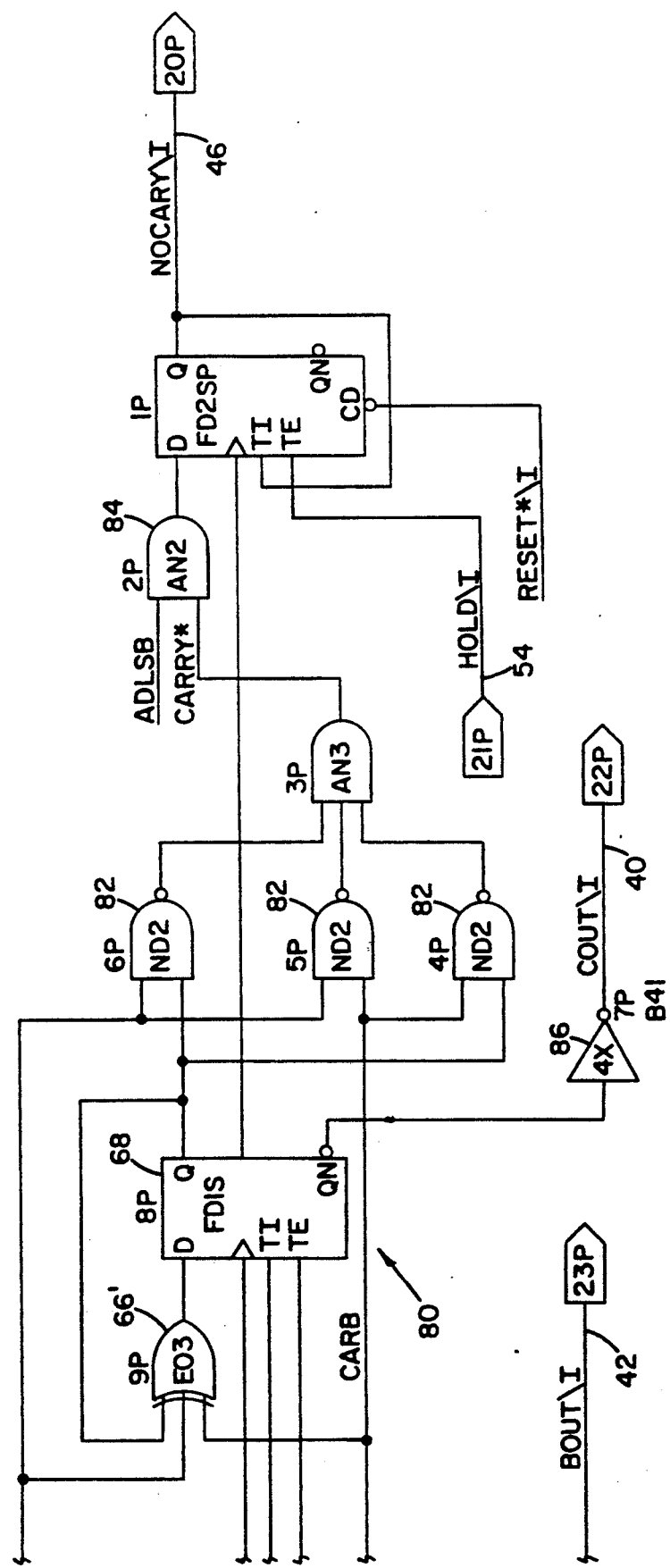

Adder 24 shown in FIGS. 1C and 3A-3B is a special version of an N-bit adder used to count the bits of each partial word. Its special arrangement is due to its use in a DS3 to SONET transfer circuit and in particular due to the nature of the DS3 frame (see copending application entitle AIS/Idle code generator by William H. Stephenson Jr., filed on the same day herewith and assigned to the same assignee). Thus as seen in FIG. 3A, this adder actually counts via a Plus 1 input 62 and a Plus 5 input 64. The adder is used to control the word alignment of the parallel data shifter modules 22. The Plus 1 and the Plus 5 inputs are used to force the counter to count by one or by five respectively. Adder 24 is a 3-bit counter with carry. Each stage comprises an XOR gate 66 which outputs to a D type flip-flop 68. The inputs to the XOR gates consist of carrys from the previous stages and the Q output of its flip-flop. The flip-flops reset to zero when the RESET* signal 70 is active (enabled) on the 'TE' input which loads a zero into the 'TI' input. The LSB stage 72 OR's the Plus 1 and Plus 5 inputs and feeds the output, ADLSB, to the XOR gate 66* and to AND gate 74. This AND gate generates a carry, CARA, whenever ADLSB and the Q output are high. The CARA signal feeds the second stage XOR gate and an AND gate 76. The second AND gate combines CARA and the Q output of the second flip-flop to produce a carry, CARB. The MSB, stage 80, as shown in FIG. 3B, uses a 3-input XOR gate 66' to check Plus 5, CARB, and the Q output of its own flip-flop. A combination of three NAND gates 82 are used to decode values 3 to 7 and Plus 4, and value 7 and Plus 1 so as to generate a carry (CARRY*). The CARRY* and ADLSB signals are AND'ed by gate 84 to produce a NOCARRY (shown NOCARRY in the figures) enabled signal required for the control logic and storage module 22 (see FIG. 1C). The HOLD input causes this value to be recirculated during a gap in the data stream. High drive buffers 86 are used to output the value of the adder. The COUT output 40 is the MSB, the BOUT is the middle bit, and AOUT is the LSB. These outputs are the corresponding CIN, BIN, AIN inputs shown in FIGS. 1C and 2A, 2B.

Of course, any N-bit adder could be used to count the bits of each partial word and to generate an appropriate output on binary output lines corresponding in number so as to generate N permutations. This adder would also generate a NOCARRY output whenever the number of remaining bits from the previous cycle plus the number of bits for a current partial data word are less than N.

Having described the invention, what is claimed is:

1. A partial word to full word parallel data shifter so as to convert incoming parallel data containing zero to N data bits into output data of N data bits, comprising:
   A) means, under control of a selection signal, for selectively receiving bits from the incoming parallel data and selectively receiving remainder bits of data and for outputting the selectively received data in 2N−1 parallel bits;
   B) means for receiving the 2N−1 bits from the selective receiving means for outputting N parallel data bits and for outputting up to N−1 remainder bits to the selective receiving means, said means for receiving 2N−1 bits including means for causing the output bits to be recirculated as remainder bits if a NOCARRY signal is enabled; and
   C) means for adding the number of remainder bits to the number of data bits of the current incoming parallel data so as to generate an enabled NOCARRY signal if said addition is less than N, and for generating a selection signal based upon said addition for controlling the received bits of the selective receiving means.

2. A partial word to full word parallel data shifter as defined in claim 1, wherein the means for selectively receiving bits from the incoming parallel data and remainder bits of data comprises 2N−1 multiplexers.

3. A partial word to full word parallel data shifter as defined in claim 2, wherein the adding means generates the selection signal on X output lines, where X is defined by the equation $2^X = N$.

4. A partial word to full word parallel data shifter as defined in claim 3, wherein at least some of the 2N−1 multiplexers contain up to N inputs selectable by said selection signal.

5. A partial word to full word parallel data shifter as defined in claim 4, wherein the means for receiving the 2N−1 bits from the selective receiving means comprises 2N−1 bit latches with output of N of said latches outputting said N parallel data bits and the remaining N−1 latches outputting up to N−1 remainder bits.

6. A partial word to full word parallel data shifter as defined in claim 5, wherein the means for causing the output bits to be recirculated as remainder bits if a NO- CARRY signal is enabled, comprises a two stage multiplexer having a first set of N−1 inputs connected to the outputs of the N−1 remaining latches and a second set of inputs connected to outputs of N−1 bits of the first N latches, and further having an input connected to the NOCARRY signal for selecting the outputs of N−1 bits of the first N latches if NOCARRY is enabled and for selecting the outputs of the N−1 remaining latches otherwise.

7. A partial word to full word parallel data shifter as defined in claim 6, where N=8.

8. A partial word to full word parallel data shifter as defined in claim 1, further comprising means for generating a signal that prevents the means for outputting N parallel data bits from having said parallel data bits used if the NOCARRY signal is enabled.

9. A method of converting incoming parallel data which may contain from zero to N data bits into an outgoing parallel word containing N data bits comprising the steps of:

1) selectively receiving bits based upon a selection signal, from the incoming parallel data as well as from remainder bits of data and for outputting the selectively received data as 2N−1 parallel bits;
2) receiving the 2N−1 parallel bits so as to output N parallel data bits and up to N−1 remainder bits of data for receiving by step 1, wherein said receiving step includes the substep of causing the output bits to be recirculated as remainder bits if an enabled NOCARRY signal is detected; and
3) adding the number of remainder bits to the number of data bits of the current incoming parallel data so as to generate an enabled NOCARRY signal if the addition is less than N and for generating a selection signal based upon said addition for controlling the received bits by the selective receiving step.

10. A method of converting incoming parallel data as defined in claim 9, wherein an enabled NOCARRY signal inhibits the output of the N parallel data bits.

* * * * *